Masayoshi Sato
INVENTOR.
BY Wenderoth, Lind and Ponack, attorneys

Aug. 23, 1966 MASAYOSHI SATO 3,268,854

SUBMARINE COMMUNICATION SYSTEM

Filed Feb. 7, 1964 3 Sheets-Sheet 2

Masayoshi Sato

INVENTOR.

BY Wenderoth, Lind and Ponack, attorneys

FIG. 6
FIG. 5
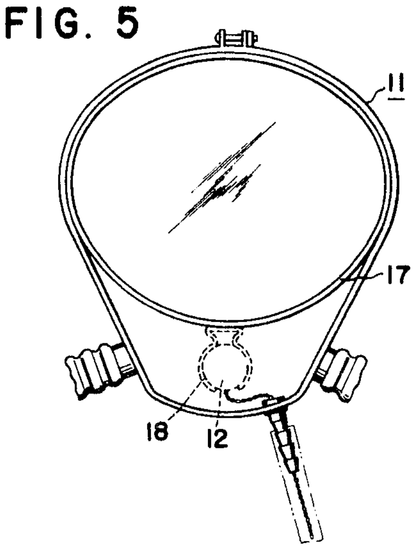
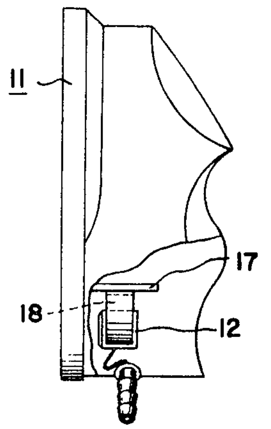
FIG. 7
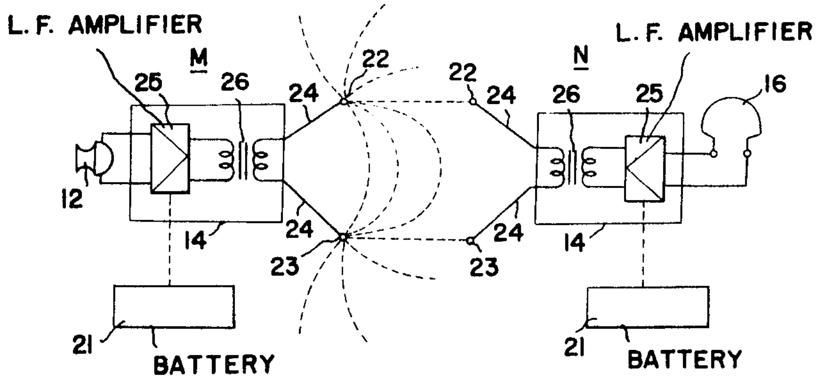
Masayoshi Sato
INVENTOR.
BY Wenderoth, Lind and Ponack, attorneys 3,268,854

SUBMARINE COMMUNICATION SYSTEM

Masayoshi Sato, 1828 2-chome, Yahara-machi, Nerima-ku, Tokyo-to, Japan

Filed Feb. 7, 1964, Ser. No. 343,312
Claims priority, application Japan, Feb. 11, 1963, 38/5,650; Mar. 30, 1963 (utility model), 38/20,719; Sept. 30, 1963, 38/52,919
1 Claim. (Cl. 340—4)

This invention relates to a new submarine communication system for use between two or more points on objects selected from surface craft, underwater craft, low-flying helicopters, submerged divers, land stations, and the like.

Although electromagnetic waves or acoustic waves have heretofore been used in this type of communication between surface craft and underwater craft, between the submerged divers, such craft and a low-flying helicopter, the use of electromagnetic waves makes it difficult to carry out such communication as described above because of large attenuation of the electromagnetic wave in seawater, and said communication by acoustic waves causes the apparatus to be of large type and expensive.

The present invention contemplates accomplishing communication of the above type through utilization of the electrical conductivity of seawater, thereby eliminating the above-stated drawbacks.

An object of this invention is to provide a communicating apparatus which is capable of performing communication by utilizing the electric conductivity of seawater and by causing a low-frequency conduction current to flow through seawater, thus providing a simple and inexpensive communication apparatus because mere connection of electrodes with an audio frequency amplifier circuit is required.

Another object of this invention is to provide an underwater conversation (or telephone) apparatus which enables submerged divers to talk freely with one another or with a person on the water surface or on the land by passing an audio-frequency conduction current through seawater.

A further object of this invention is to provide a microphone which is fitted to a diving mask so that the diver may transmit his voice in the state of an audio-frequency conduction current, and a receiver fitted to the diving mask so that the diver may receive and hear the voice current transmitted from the other party as described above, thereby enabling the divers to converse easily by means of such a simple diving mask device, which has been impossible heretofore.

Moreover, persons who are carrying the apparatus of this invention can talk freely with one another within the range of the conduction current. Further, due to the fact that the transmitting and receiving electrodes can be secured on the diver's body, the freedom of his action in the seawater is not hampered, thus enabling him to work under such conditions as high seas, violent currents, or tight places.

A further object of this invention is to provide a conversation (or telephone) apparatus which is of extremely simple and small construction, of light weight and low cost through utilization of the features that, since this invention causes an audio-frequency conduction current to be sent directly into seawater, there will be required only a low frequency audio amplifier, and that, moreover, the transmission and reception can be accomplished by means of electrodes. Consequently, it can be said that this invention has an extremely high practical value in various applications such as communication in submarine rescue work, issuing orders for group operations, communication between collectors of marine products and the crew on a surface boat, communication for inspecting the bottoms of vessels, and communication during a geological survey.

Embodiments of this invention are shown in the accompanying drawings, in which the same or equivalent members are designated by the like reference characters, and in which:

FIG. 3 is a circuit diagram showing an example of the low frequency amplifier of this invention; and FIG. 4 through FIG. 7 show embodiments of this invention as applied to communication for divers, of which;

FIG. 4 illustrates a general arrangement of the same;

FIG. 5 is an elevational view showing the rear side of the diving mask;

FIG. 6 is a side elevational view partly in section showing the mask shown in FIG. 5; and FIG. 7 is a schematic diagram, partly in block form, indicating the operating principle of the system for same application.

Figure 1:
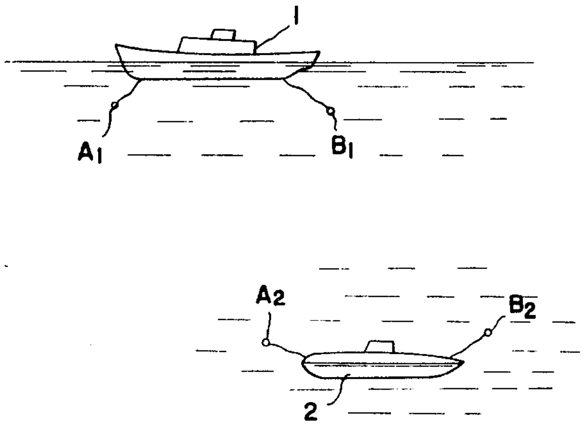
FIG. 1 is an explanatory illustration of an embodiment of this invention.

Referring to the drawings, FIG. 1 shows an example of the cases where a surface craft 1 and an underwater craft 2 are in mutual communication, and where a pair of electrodes $A_1$, $B_1$ and a pair of electrodes $A_2$, $B_2$ are respectively provided on said crafts 1 and 2, said electrodes being used in submerged state in seawater.

Figure 2:
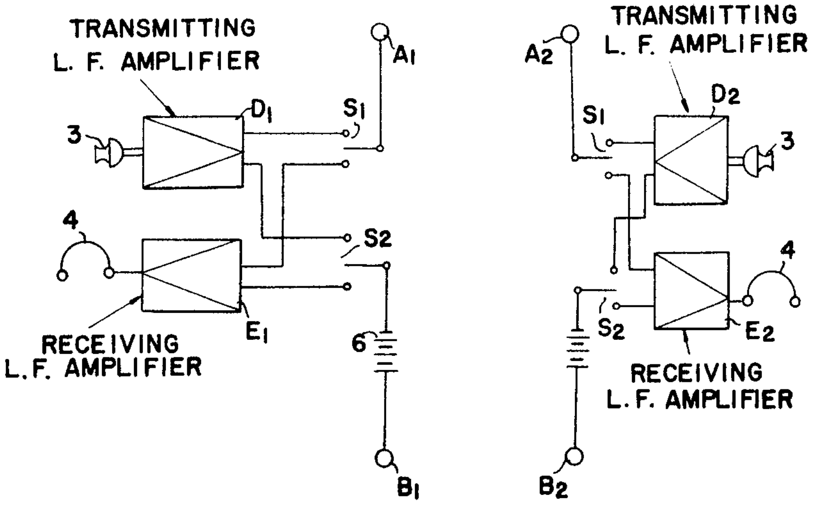
FIG. 2 is a block diagram of this invention.

Electrodes $A_1$, $B_1$ and $A_2$, $B_2$ on each communication side are connected to the matching transformer sections of transmitting and receiving audio-frequency amplifiers $D_1$, $D_2$ and $E_1$, $E_2$, respectively, by means of change-over switches $S_1$ and $S_2$ as shown in FIG. 2, in which microphones 3, receivers 4 and power sources 6 are provided.

Figures 3, 4:
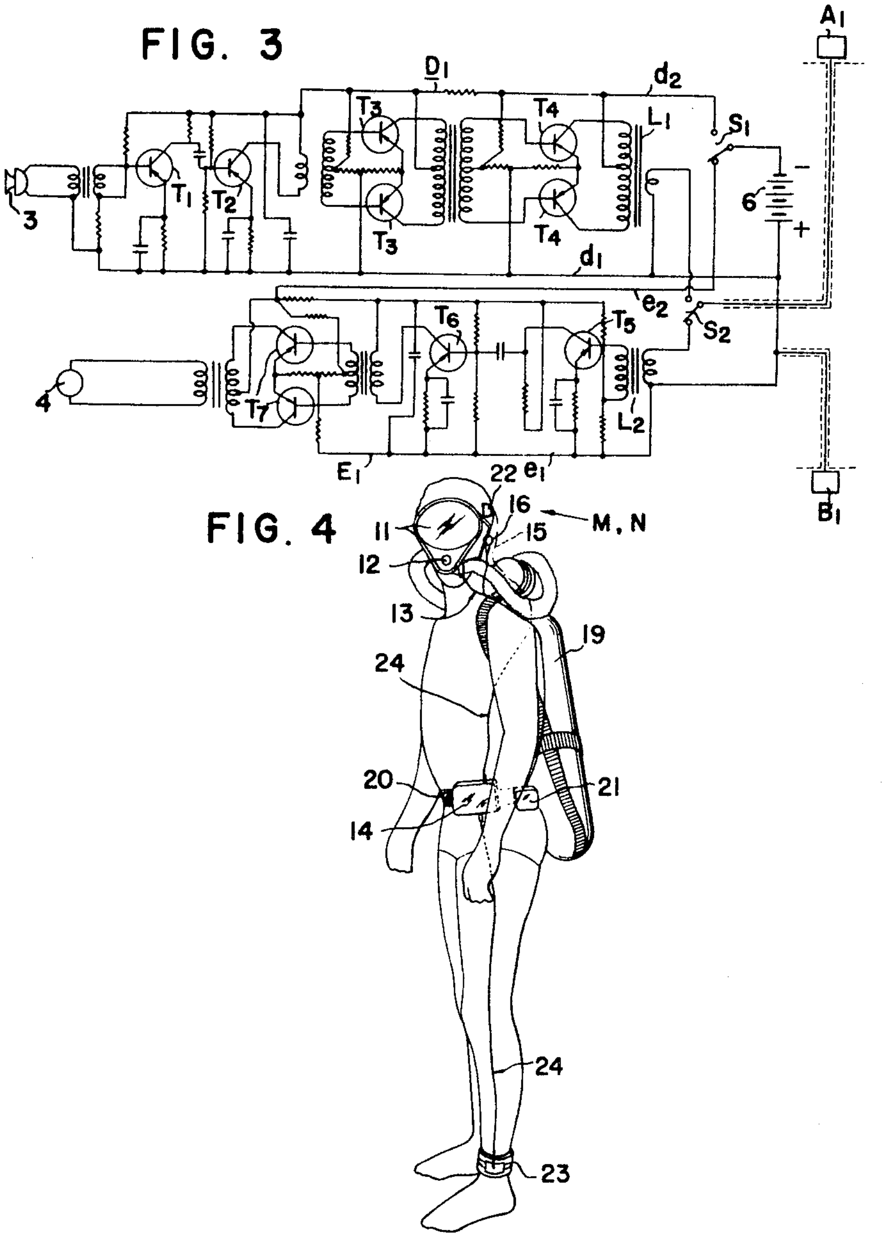

FIG. 3 shows an example of the amplifier and the matching transformer sections in said audio-frequency amplifiers $D_1$ and $E_1$. Transmitting audio-frequency amplifier $D_1$ is a four-stage amplifier composed of transistors $T_1$, $T_2$, $T_3$ and $T_4$, and provided between a microphone 3 and an output transformer $L_1$. Receiving audio-frequency amplifier $E_1$ is a three-stage amplifier composed of transistors $T_5$, $T_6$ and $T_7$, and provided between an input transformer $L_2$ and a receiver 4.

Poles $d_1$ and $e_1$ of said amplifiers $D_1$ and $E_1$ are connected to the plus terminal of power source 6 and transmitting and receiving electrode $B_1$, respectively, whereas poles $d_2$ and $e_2$ of said amplifiers $D_1$ and $E_1$ are connected selectively to the minus terminal of power source 6 by means of change-over switch $S_1$. The movable contact arm of change-over switch $S_2$ connected at its stationary contacts with the respective secondary and primary coils of transformers $L_1$ and $L_2$ is connected to electrode $A_1$. The other terminals of said coils are connected to poles $d_1$ and $e_1$, respectively.

In the apparatus of FIG. 3, when change-over switches $S_1$ and $S_2$ are in the positions shown in the drawing, receiving audio-frequency amplifier $E_1$ and power source 6 are connected to electrodes $A_1$ and $B_1$, whereby the apparatus is in a receiving condition. When change-over switches $S_1$ and $S_2$ are switched to their opposite directions, transmitting audio-frequency amplifier $D_1$ is connected to the power source 6 and electrode $A_1$, whereby the apparatus is brought in a transmitting condition.

The construction and operation of audio-frequency amplifiers $D_2$ and $E_2$ in FIG. 2 are entirely the same as those described in connection with FIG. 3.

Now, let it be supposed that a person on surface craft 1 is talking through microphone 3 with audio-frequency amplifier $D_1$ set in a transmitting condition, his voice is amplified by audio-frequency amplifier $D_1$, whereby power is supplied from matching transformer $L_1$ to electrodes $A_1$ and $B_1$, with the result that an audio-frequency conduction current corresponding to said voice current is produced from electrodes $A_1$ and $B_1$ and flows into the seawater.

When said conduction current reaches electrodes $A_2$ and $B_2$ of underwater craft 2 whose audio-frequency amplifier $E_1$ is set in a receiving condition, this weak current goes through matching transformer $L_2$ and is amplified by audio-frequency amplifier $E_1$ and reaches receiver 4. In exactly the same manner as described above, the voice of a person in the underwater craft 2 can reach the person on surface craft 1, thus enabling the surface craft and the underwater craft to communicate freely.

In the same manner, relative communication between two parts selected from surface craft, underwater craft, land stations, low-flying helicopters and the like can be effectively attained with the same result.

In FIG. 4 through FIG. 7 is shown an embodiment of this invention as applied to communication between divers, wherein a microphone 12 is secured in front of the mouth piece of a diving mask 11, said microphone 12 being connected by a lead wire 13, to a transmitting and receiving apparatus 14 provided on the diver's body, and the receiving section of said apparatus 14 is connected by a lead wire 15 to an ear-phone 16 provided near the diver's ear.

As shown in FIG. 6, a partition plate 17 is disposed adjacent to the lower portion of the nose part of diving mask 11, and a spring plate 18 is provided under said plate 17 to hold said microphone 12. There are also shown a tank 19 for supplying air, a belt 20, a battery 21, and a pair of electrodes 22 and 23 adapted to flow into or receive from seawater an audio-frequency conduction current, said electrodes 22 and 23 being respectively provided at the diver's head and ankle and connected to apparatus 14 by lead wires 24, as shown in FIG. 4.

FIG. 7 indicates the operating principle of the embodiment as shown in FIGS. 4 to 7. On each of both sides M and N in FIG. 7, an audio-frequency amplifier 25 and a matching transformer 26 are provided in the transmitting and receiving apparatus 14. Electrodes 22 and 23 are connected to terminals of the output coil (transmitting side) or input coil (receiving side) of transformer 26 through lead wires 24.

The person to transmit is designated by M and the person to receive by N. Microphone 12 of M is connected to the input section of amplifier 25 and the input coil of transformer 26 is connected to the output section of said amplifier 25. On the other hand, the output coil of transformer 26 of N is connected to the input section of amplifier 25, and ear-phone 16 is connected to the output section of said amplifier 25.

By the above described construction and arrangement of this system, when M transmits or talks into microphone 12, there is produced an electric current which is proportional to the voice so transmitted, said current thereupon being sent to transmitting and receiving apparatus 14. After amplified by amplifier 25, said current is applied to electrodes 22 and 23. Thereupon, there is produced a conduction current proportional to the current of an audio frequency, which flows into the seawater.

When said conduction current reaches the electrodes 22 and 23 of N, said current causes an induced voltage having the same frequency as that of the audio frequency of M in matching transformer 26 of N. Said voltage is then amplified amplifier 25 of transmitting and receiving apparatus 14 of N and thereafter reaches ear-phone 16. Conversely, transmission from N reaches the ear-phone of M in the same manner, thus enabling, M and N to converse freely.

*Numerical example*

In the embodiment of FIG. 3, when the distance between electrodes $A_1$ and $B_1$, impedance of the matching transformer circuit on the electrode side, output power, and amplification on the receiving side were taken selected to be 1.5 m., 2Ω, 1.5 w. and 90 db, respectively, the transmitting distance was 200 m.

The above-mentioned example relates to the case in which the transmitting and receiving amplifier circuits are individually separated, but they may be substituted by a common amplifier circuit. Furthermore, the present invention can be embodied as a simultaneous communication system without any change-over switch.

Since it is obvious that many changes and modifications can be made in the above described details without departing from the nature and spirit of the invention, it is to be understood that the invention is not to be limited to the details described herein except as set forth in the appended claim.

What is claimed is:

In a diver's apparatus having a belt, head covering portion having a face mask forming a part thereof, and an ankle band for one of the diver's ankles, the combination of an electronic receiving and transmitting system including amplifying circuitry contained within a case mounted on said belt, a battery power supply on said belt and connected to said amplifying circuitry, a first electrode for transmitting and receiving electronic currents to and from the water mounted on said ankle band and facing exteriorly thereof for contact with the water, said first electrode being connected to said amplifying circuitry, a second electrode for transmitting and receiving electronic currents to and from the water mounted on said head covering portion and facing exteriorly thereof for contact with the water, said second electrode being connected to said amplifying circuitry, an earphone mounted within said head covering portion adjacent the diver's ear and being connected to said circuitry, and a microphone connected to said circuitry, said face mask having a partition plate adjacent to the nose part of the mask, a spring clip depending from the lower surface of said partition plate, and said microphone being held in said spring clip.

References Cited by the Examiner

UNITED STATES PATENTS

| | | | |
|---|---|---|---|
| 3,003,136 | 10/1961 | Burnett | 340—5 |
| 3,064,089 | 11/1962 | Ward | 179—22 |
| 3,172,076 | 3/1965 | Alinari | 340—4 |

CHESTER L. JUSTUS, *Primary Examiner.*

R. A. FARLEY, *Assistant Examiner.*